United States Patent
Doucette et al.

(10) Patent No.: US 12,553,238 B2
(45) Date of Patent: Feb. 17, 2026

(54) CEILING FRAME MOUNTING ASSEMBLY

(71) Applicant: ASC Engineered Solutions, LLC, Portsmouth, NH (US)

(72) Inventors: Gregory Steven Doucette, Wood River Junction, RI (US); Joseph William Beagen, Jr., North Attleboro, MA (US)

(73) Assignee: ASC ENGINEERED SOLUTIONS, LLC, Oak Brook, IL (US)

( * ) Notice: Subject to any disclaimer, the term of this patent is extended or adjusted under 35 U.S.C. 154(b) by 439 days.

(21) Appl. No.: 17/985,651

(22) Filed: Nov. 11, 2022

(65) Prior Publication Data

US 2024/0159052 A1 May 16, 2024

(51) Int. Cl.
*E04B 9/16* (2006.01)

(52) U.S. Cl.
CPC ...................... *E04B 9/16* (2013.01)

(58) Field of Classification Search
CPC . E04B 9/006; E04B 9/16; E04B 9/183; E04B 9/205; A62C 35/68; F16L 3/24; F16L 3/245; F16M 13/027
USPC .......... 52/506.06, 506.07; 248/62, 72, 200.1, 248/228.7, 230.7, 231.81, 342, 343
See application file for complete search history.

(56) References Cited

U.S. PATENT DOCUMENTS

| | | | | |
|---|---|---|---|---|
| 718,545 A | * | 1/1903 | Streeter | F16B 7/0486 248/228.7 |
| 1,670,902 A | * | 5/1928 | Popps | F16L 3/24 248/72 |
| 2,406,315 A | * | 8/1946 | Blocher | B64C 1/06 403/387 |
| 3,053,494 A | * | 9/1962 | Stoll | F16L 3/24 248/228.3 |
| 3,307,315 A | * | 3/1967 | Schneller | E04B 9/16 403/387 |
| 4,149,693 A | * | 4/1979 | LoNigro | E04B 9/12 52/28 |
| 4,266,384 A | * | 5/1981 | Orals | E04B 9/04 52/410 |
| 5,355,646 A | * | 10/1994 | Bischel | E04B 9/16 52/489.1 |
| 5,927,037 A | * | 7/1999 | Kinsella | E04B 9/006 52/712 |

(Continued)

FOREIGN PATENT DOCUMENTS

DE          8800346        5/1988

*Primary Examiner* — James M Ference
(74) *Attorney, Agent, or Firm* — McAndrews Held & Malloy, Ltd.

(57) ABSTRACT

A support assembly comprises a hub slidably coupled to a crossbar to support a sprinkler. A pair of opposed clip assemblies comprising a frame and a bracket couple the crossbar to the ceiling channel on either side. The frame comprises an opening that supports one end of the crossbar, a skirt with an elongated slot, and a leg that extends over the channel. The bracket couples to the frame to lock the clip assembly on the ceiling channel. The bracket comprises a ridge at one edge and a flange at an opposite edge. The ridge is configured to couple to a sidewall of the ceiling channel, and the flange is configured for a user to compress and tighten the bracket. A pair of opposing clamps on either side of the bracket ensures that the frame is securely coupled to the ceiling channel.

18 Claims, 5 Drawing Sheets

(56) References Cited

U.S. PATENT DOCUMENTS

| | | | | |
|---|---|---|---|---|
| 6,119,784 A * | 9/2000 | MacDonald, III | A62C 35/68 | 52/39 |
| 6,260,810 B1 * | 7/2001 | Choi | F16L 3/24 | 248/65 |
| 6,341,466 B1 * | 1/2002 | Kehoe | F16B 2/241 | 52/39 |
| 6,345,800 B1 * | 2/2002 | Herst | E04B 9/006 | 248/342 |
| 6,811,130 B1 * | 11/2004 | Oh | E04B 9/006 | 248/65 |
| 7,191,990 B2 * | 3/2007 | Hutter, III | B64C 1/406 | 248/316.4 |
| 7,276,666 B2 * | 10/2007 | Zeuner | H02G 3/0456 | 248/490 |
| 7,735,794 B1 * | 6/2010 | Gretz | E04B 9/006 | 248/200.1 |
| 7,878,464 B2 * | 2/2011 | Oh | B05B 15/62 | 248/65 |
| 8,297,579 B1 * | 10/2012 | Gretz | H02G 3/125 | 220/3.9 |
| 8,413,734 B2 * | 4/2013 | Silcox | E04B 9/006 | 52/39 |
| 9,004,421 B2 * | 4/2015 | Feenstra | E04B 9/18 | 248/200.1 |
| 9,004,422 B2 * | 4/2015 | Feenstra | E04B 9/20 | 248/200.1 |
| 9,625,059 B2 * | 4/2017 | Meister | F16L 3/1211 | |
| 10,100,973 B2 * | 10/2018 | Anderson | F16M 13/02 | |
| 10,173,088 B2 * | 1/2019 | Chong | B05B 15/63 | |
| 10,584,837 B2 * | 3/2020 | O'Brien | F21V 21/22 | |
| 2002/0066834 A1 * | 6/2002 | Choi | E04B 9/006 | 248/65 |
| 2005/0139743 A1 * | 6/2005 | Shim | E04B 9/006 | 248/342 |
| 2006/0192067 A1 * | 8/2006 | Oh | F16L 3/245 | 248/342 |
| 2007/0063121 A1 * | 3/2007 | Oh | A62C 35/68 | 248/342 |
| 2007/0258755 A1 * | 11/2007 | Chang | F16B 2/14 | 403/256 |
| 2008/0083852 A1 * | 4/2008 | Oh | F16L 3/24 | 248/74.1 |
| 2008/0083853 A1 * | 4/2008 | Oh | F16L 3/24 | 248/74.1 |
| 2008/0230238 A1 * | 9/2008 | Jackson | A62C 35/68 | 169/41 |
| 2011/0094760 A1 * | 4/2011 | Im | A62C 35/68 | 169/51 |
| 2011/0154755 A1 * | 6/2011 | Oh | A62C 35/68 | 52/220.8 |
| 2011/0155865 A1 * | 6/2011 | Oh | A62C 35/68 | 248/67.7 |
| 2011/0260012 A1 * | 10/2011 | Oh | A62C 35/68 | 248/89 |
| 2012/0298384 A1 * | 11/2012 | Silcox | E04B 9/0421 | 169/43 |
| 2013/0284862 A1 * | 10/2013 | Lim | F16L 3/245 | 248/62 |
| 2015/0060613 A1 * | 3/2015 | Lim | F16L 3/245 | 248/75 |
| 2015/0377386 A1 * | 12/2015 | Mitchell | F16L 3/1075 | 29/428 |
| 2016/0023028 A1 * | 1/2016 | Jung | F16M 13/027 | 248/316.2 |
| 2016/0221018 A1 * | 8/2016 | Oh | F16B 2/10 | |
| 2016/0296778 A1 * | 10/2016 | Seo | F16L 3/24 | |
| 2017/0044767 A1 * | 2/2017 | Gloftis | E04B 9/225 | |
| 2018/0100527 A1 * | 4/2018 | Dafonseca | F16B 2/065 | |
| 2018/0100607 A1 * | 4/2018 | Dafonseca | A62C 35/68 | |
| 2020/0191325 A1 * | 6/2020 | Roberts | F16B 2/10 | |
| 2024/0159052 A1 * | 5/2024 | Doucette | E04B 9/205 | |
| 2024/0200329 A1 * | 6/2024 | Beagen, Jr. | E04B 9/067 | |

* cited by examiner

CEILING FRAME MOUNTING ASSEMBLY

TECHNICAL FIELD

This disclosure relates to ceiling installations. More specifically, this disclosure relates to a clip assembly for a ceiling frame, such as a hat-channeled ceiling frame.

BACKGROUND

Ceiling frame mounting assemblies are used to support connections to a ceiling frame. Lights, sprinklers, vents, wiring, and other electrical, mechanical, HVAC, or other systems may be connected to a ceiling frame. A mounting assembly connects the system to the ceiling frame. Vibration testing and fire simulations demonstrate that the support assembly may need to support the system in high vibratory and/or heat conditions during a natural disaster, such as a fire, earthquake, or hurricane. Disclosed herein is a ceiling frame mounting assembly that supports one or more systems in the ceiling.

SUMMARY

It is to be understood that this summary is not an extensive overview of the disclosure. This summary is exemplary and not restrictive. The summary is not intended to either identify key or critical elements of the disclosure or delineate the scope thereof. The sole purpose of this summary is to explain and exemplify certain concepts of the disclosure as an introduction to the following complete and extensive detailed description.

One aspect comprises a clip assembly comprising a frame and a bracket. The frame comprises an opening configured to receive a portion of a trave. The frame comprises a skirt with a fissure, and a leg with a knee and a foot defining a slot. The bracket comprises a ridge at one edge of the bracket and a flange at an opposite edge of the bracket. A base of the bracket is interposed between the ridge and the flange. A pair of fastener openings pass through the base. A pair of opposing clamps are coupled to opposite sides of the base. Each clamp comprises an arcuate guide, an overlay, and a bent wing.

In another aspect, disclosed is a bracket comprising a ridge at one edge and a flange at a second edge opposite the ridge. A base is interposed between the bracket and the flange and comprises at least two fastener openings. A first clamp is coupled to a first side of the base, and a second clamp is coupled to a second side of the base. The clamps comprise an arcuate guide, a clamping overlay attached to the arcuate guide and extending inwardly from the first side of the base, and a bent wing projecting over the base at the second side and extending from the clamping overlay.

In yet another aspect, disclosed is a support assembly. The support assembly comprises a hub slidably coupled to a crossbar. The hub adjustably supports a sprinkler. The support assembly comprises a pair of opposing frames, each comprising an opening supporting a left or right end of the crossbar, a skirt with an elongated slot, and a leg. The leg comprises a knee and foot to form a slot. The support assembly comprises a pair of opposing brackets for each frame. Each bracket comprises a ridge at one edge and a flange at an opposite edge of the bracket. A base is interposed between the edges at the ridge and the flange. The base comprises a fastener opening and a clamp coupled to a side of the bracket. The clamp comprises an arcuate guide, a clamping overlay, and a bent wing.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained using the systems, methods, and features particularly pointed out in the appended claims. These and other features will become more fully apparent from the following description and appended claims or may be learned by the practice of such exemplary implementations.

BRIEF DESCRIPTION OF THE DRAWINGS

The accompanying drawings, which are incorporated in and constitute a part of this specification, illustrate several aspects of the disclosure and, together with the description, explain various principles of the disclosure. The drawings are not necessarily drawn to scale. Corresponding features and components throughout the figures may be designated by matching reference characters for consistency and clarity.

DETAILED DESCRIPTION

Figure 1:
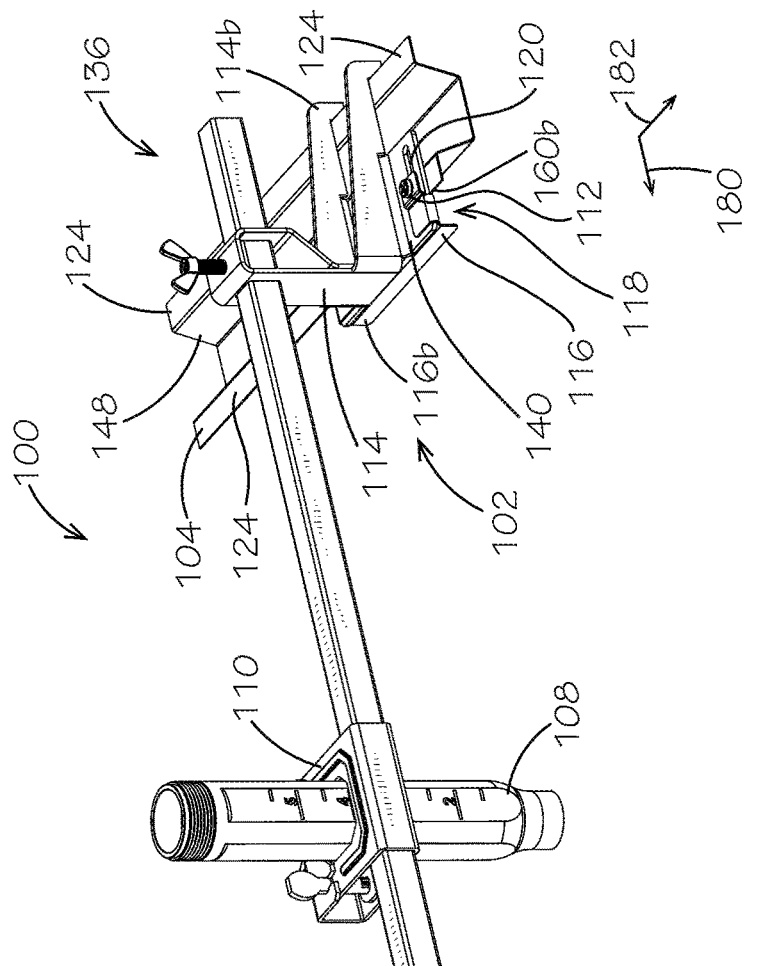
FIG. 1 is a perspective view of a support assembly in accordance with one aspect of the current disclosure.
Figure 1:
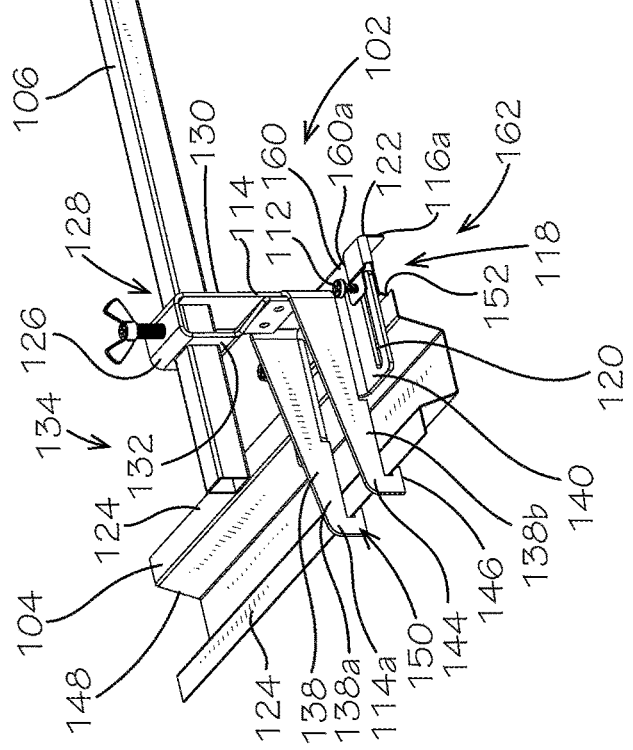

The present disclosure can be understood more readily by referencing the following detailed description, examples, drawings, and claims, and their previous and following description. However, before the present devices, systems, and/or methods are disclosed and described, it is understood that this disclosure is not limited to the specific devices, systems, and/or methods disclosed unless otherwise specified, as such can, of course, vary. It is also understood that the terminology used solely describes particular aspects and is not intended to be limiting.

The description enables teaching of the present devices, systems, and/or methods in their currently known aspects. To this end, those skilled in the relevant art will recognize and appreciate that many changes can be made to the various aspects described herein while obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" comprise plural referents unless the context dictates otherwise. Thus, for example, reference to a quantity of one of a particular element can comprise two or more such elements unless the context indicates otherwise. In addition, any elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about," "approximately," or "substantially," it will be understood that the particular value forms another aspect. It will be further understood that the endpoints of each of the ranges are significant both in relation to the other endpoint and independently of the other endpoint.

A material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials and processes and between different models, the tolerance for a particular measurement of a particular component can fall within a range of tolerances.

As used herein, the terms "optional" or "optionally" mean that the subsequently described event or circumstance may or may not occur and that the description comprises instances where said event or circumstance occurs and instances where it does not.

The word "or" as used herein means any one member of a particular list and also comprises any combination of members of that list. The phrase "at least one of A and B," as used herein, means "only A, only B, or both A and B." The phrase "one of A and B" means "A or B."

Unless the context dictates otherwise, the term "monolithic" in the description of a component means that the component is formed as a singular component that constitutes a single material without joints or seams.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the seat nearest to and occupied by a user of a seat; "rear" is that end of the seat that is opposite or distal the front; "left" is that which is to the left of or facing left from a person sitting in the seat and facing towards the front; and "right" is that which is to the right of or facing right from that same person while sitting in the seat and facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a support assembly 100 (e.g., a fire sprinkler support assembly) and associated methods, systems, devices, and various apparatuses are disclosed herein. The support assembly 100 can be mounted in a ceiling, or other structure, and can support sprinklers, lights, vents, fire alarms, water, electric, structural, and/or other ceiling installations. In various aspects, the support assembly 100 can comprise a pair of opposed sliding clip assemblies 102 that can couple to a ceiling frame or trave 104, illustrated as a hat channel, to support a crossbar 106 and a sprinkler 108 at a hub 110.

The sliding clip assembly 102 can comprise a pre-installed or piercing fastener, shown as a screw 112, that facilitates a secure installation of an L-shaped housing, body, or frame 114 on a ceiling installation. Frame 114 and a bracket 116 capture opposite ends of the ceiling frame or trave 104 and cooperate to capture portions of trave 104 to secure the frame 114 and support the crossbar 106, with the associated sprinkler 108 at hub 110. Bracket 116 comprises two opposed clamps 118 that can slide relative to frame 114 to sandwich a portion of frame 114 and a portion of trave 104. The screw 112 can then be tightened to extend through an elongated slot or fissure 120 to secure the frame 114 on trave 104. When the screw 112 is tightened or torqued, it can punch through a side-flange 124 of trave 104 to secure the bracket 116 and tightly clamp the frame 114. The bracket 116 can comprise an angled or bent portion, shown as an arcuate guide 122, that can press against or mate with the side-flange 124 of trave 104 to prevent the bracket 116 from sliding too far onto trave 104.

FIG. 1 is a perspective view of a support assembly 100 comprising a hub 110 slidably coupled to a crossbar 106. Hub 110 is adjustable and slides along crossbar 106 to support a sprinkler 108, e.g., a fire sprinkler 108 within the ceiling of a building. The sprinkler 108 and/or hub 110 can be similar to those shown and described, for example and without limitation, in U.S. Pat. Nos. 9,889,327 and 10,527,203, each of which is incorporated herein by reference. A frame 114 supports either end 134, 136 of the crossbar 106 so that the sprinkler 108 is balanced. Vibration testing and fire simulations show that the support assembly 100 can support the sprinkler 108 in high vibratory and heat conditions. Frame 114 comprises a head 126 with an opening 128 on an inner side 130 and an opening 128 on an outer side 132 of the frame 114. For example, frame 114a can support one end 134 of the crossbar 106, and an opposed or second frame 114b can support a second or opposite end 136. As used herein, frame 114 comprises frame 114a and frame 114b unless expressly noted otherwise. Frame 114 comprises one or more legs 138 (e.g., leg 138a and leg 138b) with a skirt 140 extending along a bottom of the frame 114 to support the frame 114 on a plane, e.g., a horizontal plane 142 defined by side flanges 124 of trave 104. Skirt 140 can comprise an elongated slot, shown as fissure 120.

In various aspects, frame 114 can comprise a plurality of skirts 140, legs 138, and other structures, e.g., a first skirt 140 opposing a second skirt 140 to balance frame 114 on trave 104. Each leg 138 of frame 114 comprises a knee 144 and a foot 146. Knee 144 bends around one of the side flanges 124 of trave 104. Foot 146 captures the side-flange 124 and can press against a sidewall 148 and/or the side-flange 124 of trave 104 when installed and bracketed. In other words, a slot 150 can be formed in frame 114 between the knee 144 and the foot 146 of each leg 138. Slot 150 is configured to capture one side of trave 104 when bracket 116 is in the closed or bracketed position, shown on the right side of FIG. 1. When bracket 116 is secured by pressing against a portion of trave 104 (e.g., side-flange 124 or sidewall 148), the slot 150 (e.g., between knee 144 and foot 146) can capture an opposing portion of trave 104 (e.g., an opposite side-flange 124 or sidewall 148) to secure frame 114 and support crossbar 106 to the trave 104.

Figure 2:
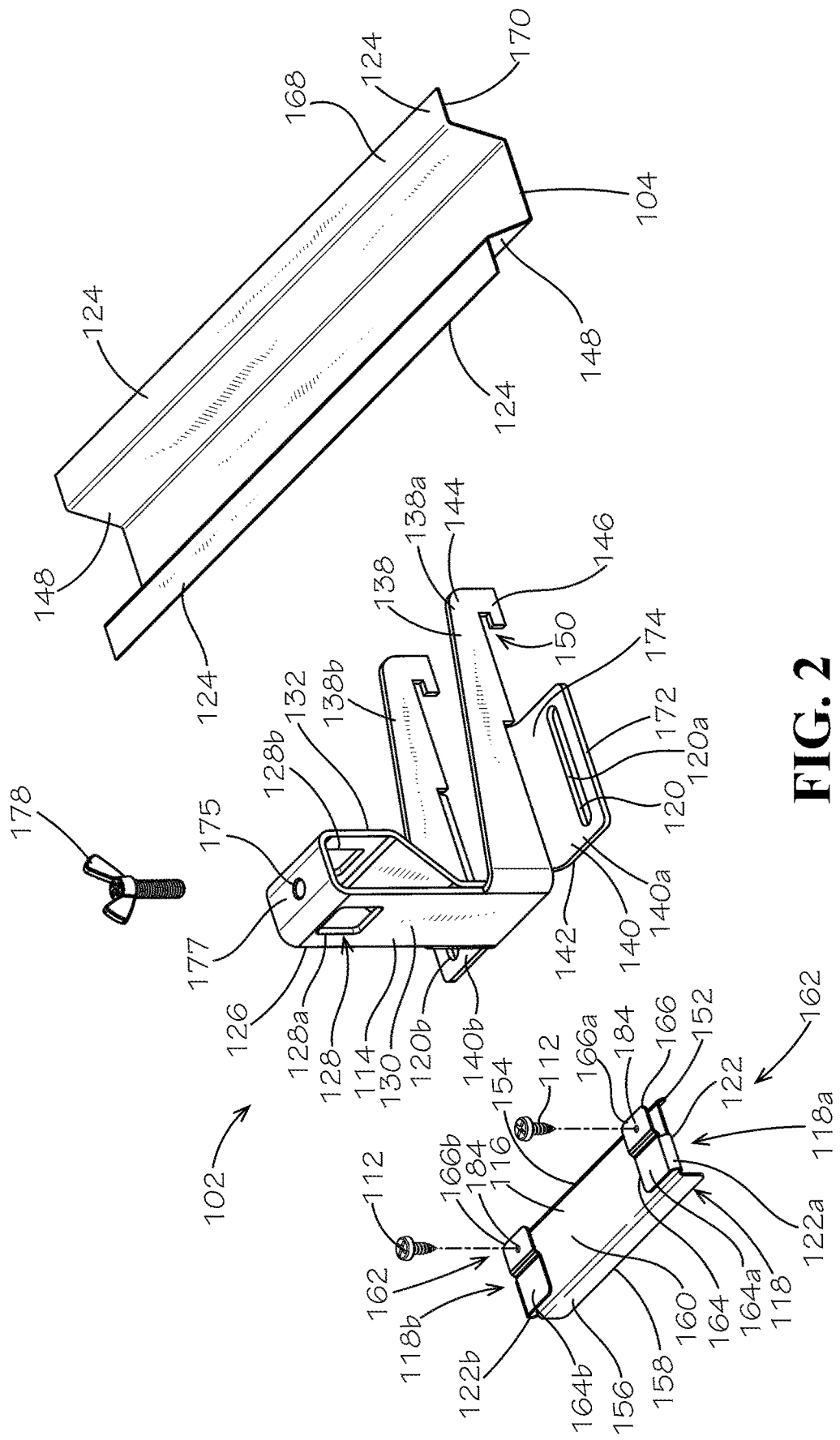
FIG. 2 is an exploded view of a clip assembly, as shown in FIG. 1.

FIG. 1 shows bracket 116 in both a bracketed or locked configuration (on the right-hand side) and an unbracketed or unlocked configuration (on the left-hand side). As shown, bracket 116 is the same on both sides of crossbar 106 except for whether bracket 116 is in the unbracketed or bracketed configuration. FIG. 2 shows a ridge 152 at an edge 154 of bracket 116 that can secure the bracket 116 against the sidewall 148 or side-flange 124 of trave 104. Similarly, a flange 156 located at an opposite edge 158 of the bracket 116 is used to grip the bracket 116 and slide the bracket 116 over a portion of trave 104. The bracket 116 comprises a base 160 interposed between ridge 152 and the flange 156 with a fastener opening 184 configured to receive screw 112. A pair of clamps 118 are coupled to and extend from opposing sides 162 of base 160 that can be somewhat perpendicular to ridge 152 and the flange 156. In some aspects, each clamp 118 comprises an arcuate guide 122, a clamping overlay 164, and a bent wing 166. Arcuate guide 122 couples the clamp 118 to the base 160 and functions as a narrow passageway that sandwiches the skirt 140 of the frame 114. Clamping overlay 164 provides a frictional clamping force on skirt 140 to prevent skirt 140 from sliding out of the bracketed configuration. Bent wing 166 is elevated from the clamping overlay 164 and provides structure to insert the screw 112 or another fastener that clamps on a portion of trave 104 or other ceiling frames. That is, bent wing 166 may not provide a frictional force on skirt 140 until screw 112 is fastened, and bent wing 166 is bent inwardly towards base 160 to capture and clamp skirt 140 against a portion of trave 104. Screw 112 can also threadedly engage with base 160 to increase the clamping force by pulling base 160 up towards bent wing 166 and pulling bent wing 166 down towards base 160.

FIGS. 1 and 2 show that support assembly 100 can comprise a plurality of frames 114a,b supporting opposite ends of crossbar 106. For example, support assembly 100 can comprise a second frame 114b comprising a second opening 128 supporting the opposite end 136 of the crossbar 106. Analogous to the first frame 114a, the second frame 114b can comprise a skirt 140 with a fissure 120. In addition, the second frame 114b can comprise a pair of legs 138, each comprising a knee 144 and foot 146. A second bracket 116 is coupled to the second frame 114b. In some aspects, the second bracket 116 comprises all the same features and components as the first bracket 116. The second bracket 116 can comprise the same ridge 152 at an edge 154 to press against the sidewall 148 of trave 104. Similarly, flange 156 at opposite edge 158 provides a gripping mechanism for an operator to press against bracket 116 and secure it on a portion of trave 104. The base 160 comprises fastener openings 176 (shown in FIG. 7) that are offset from the clamp 118 coupled to the side 162 of base 160. Stated differently, the first frame 114a and/or the second frame 114b can each comprise a pair of opposing skirts 140 and opposing legs 138 coupled to the opposing skirts 140. For example, a first skirt 140a can slide through a first arcuate guide 122a on the first side 162, and a second skirt 140b can slide through a second arcuate guide 122b on the second side 162 of bracket 116.

Figure 7:
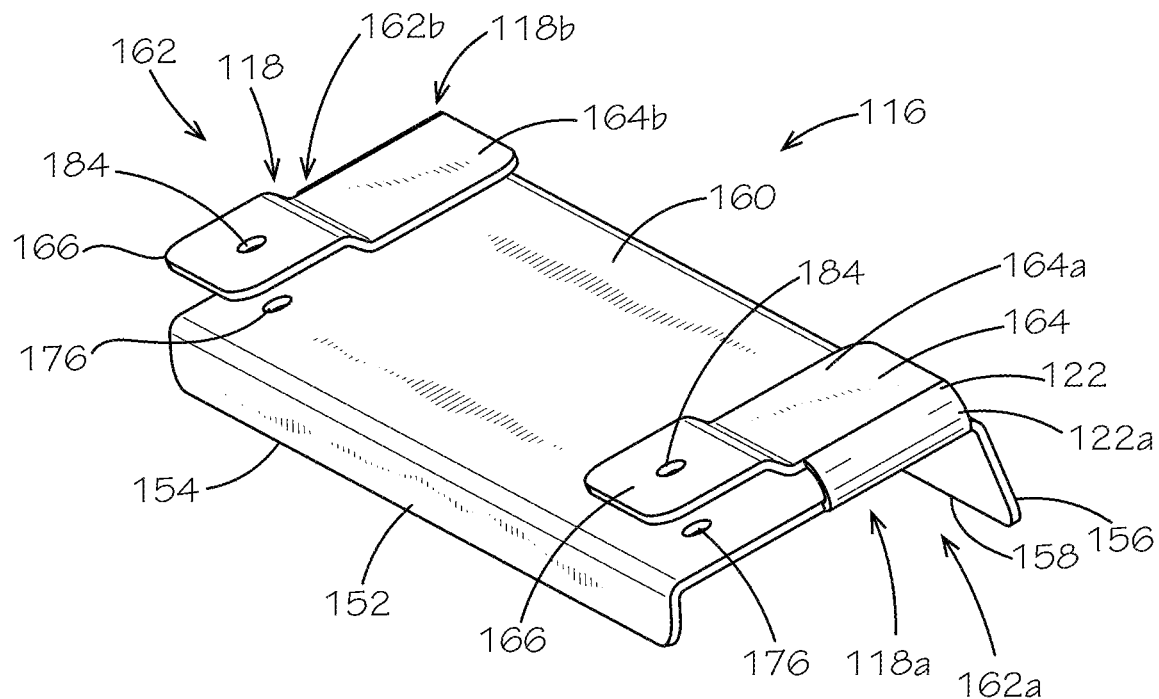
FIG. 7 is an elevated perspective view of a bracket.

In some implementations, a base 160a of a first bracket 116a and a base 160b of a second bracket 116b can define a second fastener opening 184 opposite the first fastener opening 176 (FIG. 7). In other words, multiple fastener openings 176, 184 can extend through base 160 to facilitate coupling bracket 116 against the skirt 140 of frame 114. For example, two or more fastener openings 176, 184 can extend through base 160 at opposite sides of bracket 116 to capture opposing skirts 140 of frame 114. For example, each bracket 116 comprises an opposing clamp 118 coupled to an opposite side 162. Both clamps 118 comprise an arcuate guide 122a opposing an arcuate guide 122b, a clamping overlay 164a opposing a clamping overlay 164b, and a bent wing 166a opposing bent wing 166b. The opposing nature of clamps 118a and 118b facilitates the capturing of frame 114 and ensures that bracket 116 is securely coupled to and restrains clip assembly 102. The opposing groups of clamps 118a and 118b can further support clip assembly 102 and crossbar 106 during heat or vibratory loading of support assembly 100.

FIG. 2 is an exploded view of clip assembly 102 with frame 114. Frame 114 comprises a pair of openings 128 (e.g., 128a and 128b). Openings 128 through frame 114 can be aligned to receive a portion of crossbar 106 (shown in FIG. 1), for example, at one end 134 (shown in FIG. 1) of crossbar 106. The opposite end 136 (shown in FIG. 1) of crossbar 106 can be similarly supported by a clip assembly 102 with an opposed frame 114. Each frame 114 comprises a pair of skirts 140a,b, each comprising a fissure 120 and a leg 138 extending from each skirt 140a,b of the frame 114, such that there are a pair of legs 138. Each skirt 140a,b comprises a knee 144 that covers a top portion 168 of the side-flange 124 on trave 104 and a foot 146 that at least partially covers a bottom portion 170 of the side-flange 124 on trave 104. In this way, knee 144 cooperates with foot 146 to capture a portion of side-flange 124 on trave 104. The bracket 116 and frame 114 of clip assembly 102 bear against a side-flange 124 of trave 104 opposite the knee 144 and foot 146 to securely couple the clip assembly 102 onto trave 104 and support a side of crossbar 106. The support assembly 100 is supported by a pair of opposing clip assemblies 102 spanning across two traves 104.

Bracket 116 comprises a ridge 152 at an edge 154 that bears against a sidewall 148 and/or side-flange 124 of trave 104, opposite the knee 144 and foot 146 of leg 138. A flange 156 at an opposite edge 158 of bracket 116 from ridge 152 is pressed, e.g., by the thumb of an operator, to install the bracket 116 on the underside or bottom portion 170 of the side-flange 124 and capture trave 104 between the skirt 140 and the base 160 of the bracket 116. The base 160 extends between ridge 152 and flange 156 and interposes them. Base 160 comprises a fastener opening 184 for a screw 112 or another fastener to create a compressive force against the skirt 140 of frame 114. At least one clamp 118 is coupled to one of the sides 162 (e.g., in FIGS. 7 and 8, one of the sides 162 could be side 162a, 162b, or 162a and b) of base 160 and comprises an arcuate guide 122, clamping overlay 164, and/or a bent wing 166. In various aspects, bracket 116 can comprise a pair of clamps 118 on opposing sides 162 of base 160 that cooperate to capture a frame 114 with a pair of opposing skirts 140a,b, as shown in FIGS. 1 and 2.

Arcuate guide 122 can function to capture a skirt-edge 172 of one skirt 140 (e.g., skirt 140a or 140b) on frame 114. Arcuate guide 122 can be bent metal or comprise a bow shape created by bending clamp 118 from a flat piece approximately 180° so that it doubles back over the skirt 140. In other words, arcuate guide 122 can comprise a bowed or arcuate shape to capture opposing skirt-edges 172 and/or can be formed from bending a cut sheet metal. When arcuate guide 122 captures one of the opposing skirts 140a or 140b on frame 114, the clamping overlay 164 can be disposed on a top surface 174 of skirt 140 to capture the skirt 140 of the frame 114 against the base 160 of the bracket 116. Bent wings 166 are offset from the clamping overlay 164 and can be bent downwards to capture the skirt 140 when the screw 112 is tightened. In other words, bent wings 166 function to further capture skirt 140 and secure clip assembly 102 against the side-flange 124 or sidewall 148 and restrain trave 104 between the base 160 of bracket 116 and the skirt 140 of frame 114. Clamps 118 can be located on opposing sides 162 of bracket 116 to clamp the base 160 of bracket 116 against opposing skirts 140a,b of frame 114. For example, Arcuate guide 122 can abut side-flange 124 and/or sidewall 148 of trave 104 to restrain bracket 116 against a portion of trave 104.

In various aspects, components of clip assembly 102 can be formed from a stamped or cut piece of sheet metal. Frame 114 can be formed from a cut and/or bent metallic sheet. For example, a flat sheet metal can be stamped and bent to form skirts 140a,b, legs 138, and head 126 of frame 114. Bending flat sheet metal can ensure that the openings 128 in the head 126 are correctly aligned to support crossbar 106. Similarly, bracket 116 can be stamped or cut from sheet metal and bent to form ridge 152, flange 156, and clamps 118.

Frame 114 can comprise the head 126 comprising a fastener hole 175 on a top surface 177, substantially perpendicular from the first opening 128 a. An outer side 132 of frame 114 can comprise a double-bent sheet metal. For example, the outer side 132 of frame 114 can comprise the second opening 128 b configured to receive a portion of crossbar 106 that is displaced along the axial direction of crossbar 106 away from the first opening 128 a, such that when a thumb fastener 178 is tightened in the top surface 177 of head 126, the thumb fastener 178 exerts a bracketing force that is compressively generated against the crossbar 106 and balanced in double shear within the frame 114 and reduces the shear forces exerted by the fastener 178 of the frame 114.

One or more piercing fasteners, shown as screws 112, can be installed in the bent wing 166. For example, screw 112 can be fully threaded and/or separated from bent wing 166. Rotation of screw 112 e.g., in a counter-clockwise direction, can loosen and/or separate screw 112. Conversely, the rotation of screw 112, e.g., in a clockwise direction, can tighten, fasten, and/or secure screw 112. When screw 112 is rotated in a loosening direction (e.g., counter-clockwise), the pre-installed screw 112 remains captured and retained by the bent wing 166 even when separated from the side-flange 124 of trave 104, for example, by one or more threads in the bent wing 166. That is, threads in bent wing 166 can hold and/or retain screw 112 and prevent screw 112 from falling out of frame 114 and/or bracket 116 during installation and/or removal. For example, bent wing 166 can be partially threaded in fastener openings 176 and/or 184 to prevent bracket 116 from falling off frame 114 during installation and/or removal of screw 112. In some aspects, a tip of screw 112 penetrates bent wing 166 through fastener opening 176 into slot 120 of frame 114 and can hold and/or temporarily secure bracket 166 relative to frame 114. Screw 112 can be pre-installed to penetrate slot 120 of frame 114 but does not entirely traverse slot 120 to penetrate side-flange 124 of trave 104, until installed through a tightening rotation, e.g., in a clockwise direction. In some aspects, the direction of tightening/loosening rotations can be reversed, such that screw 112 is tightened through counter-clockwise rotation and loosened through clockwise rotation to prevent inadvertent or accidental loosening of screw 112 following installation.

Frame 114 can comprise an opposing skirt 140b with a second fissure 120b. For example, the first clamping overlay 164a of the first clamp 118a captures the skirt 140a, and the second clamping overlay 164b of the second clamp 118b captures the opposing skirt 140b. The fastener or screw 112 in each bent wing 166 passes through the fissure 120 in the skirt 140 and into a side-flange 124 of trave 104.

Figure 3:
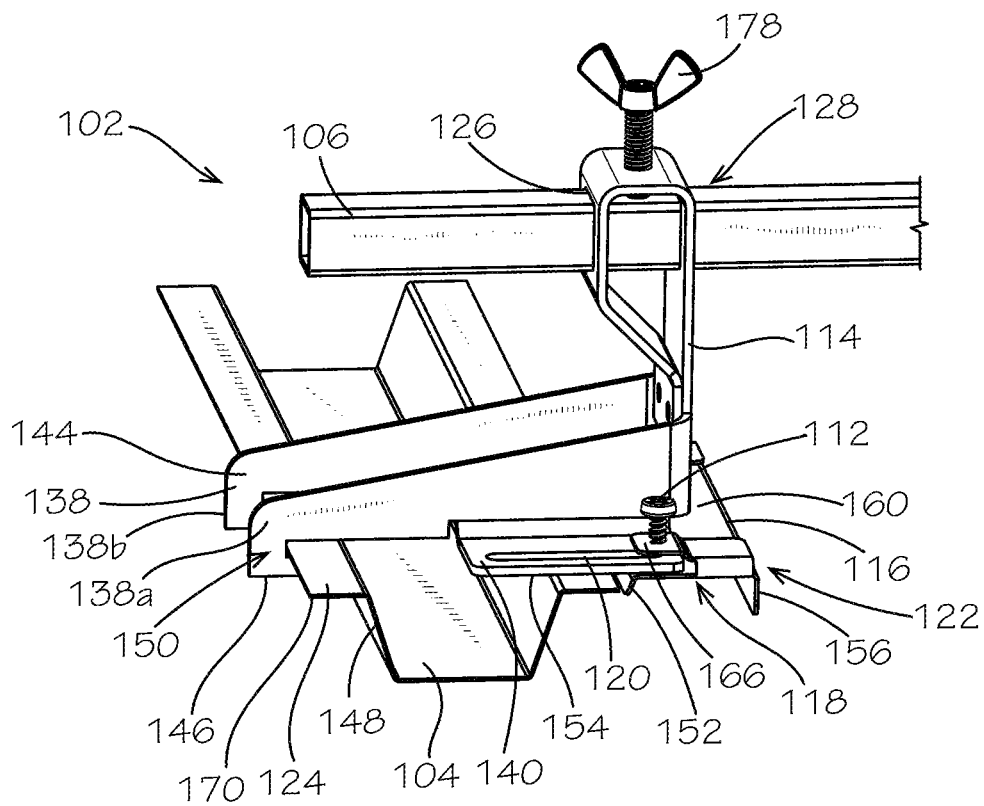
FIG. 3 is an elevated perspective view of the clip assembly of FIG. 2, shown in an open or unbracketed configuration.
Figure 4:
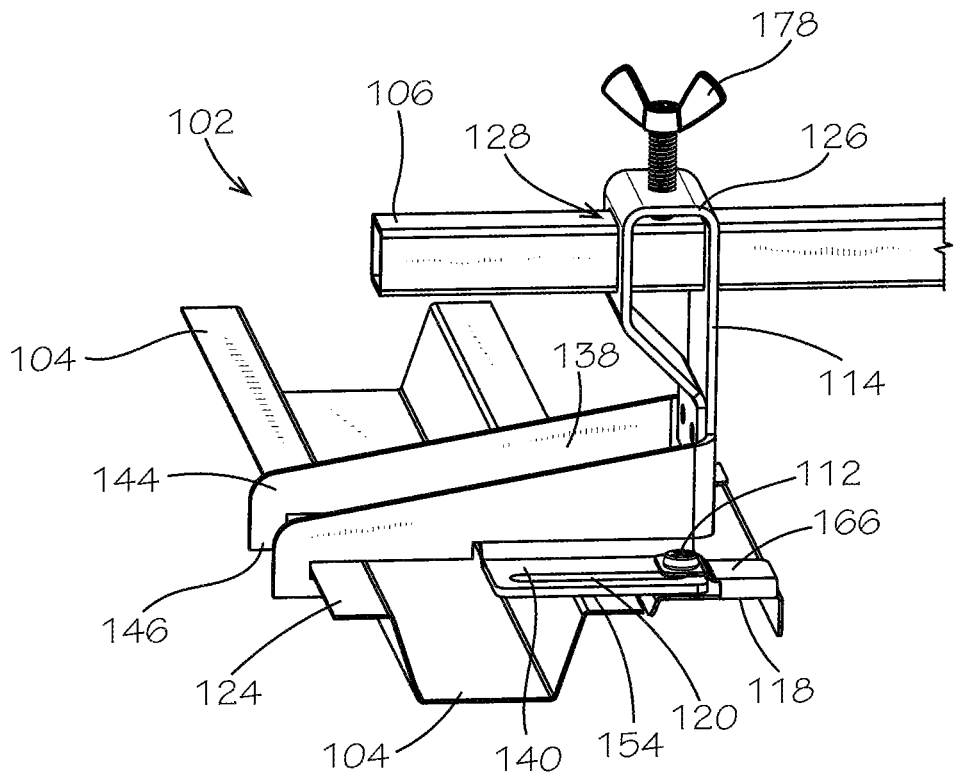
FIG. 4 is an elevated perspective view of a closed or bracketed configuration of the clip assembly shown in FIG. 3.
Figure 5:
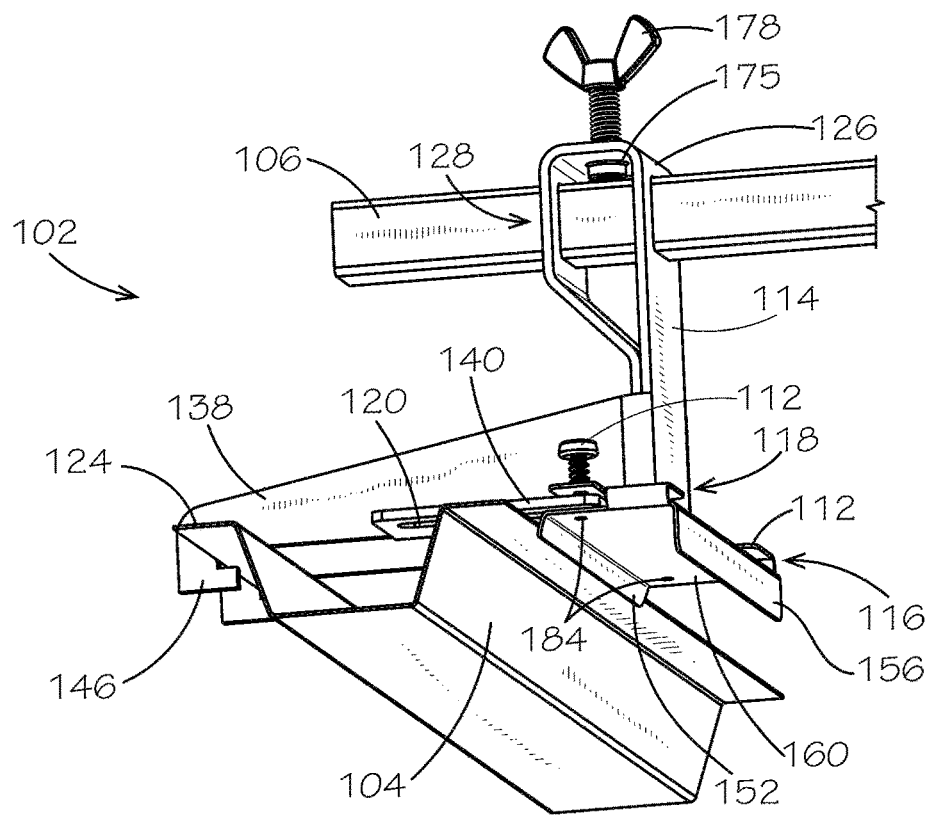
FIG. 5 is a lower perspective view of the open/unbracketed configuration of the clip assembly of FIG. 3.
Figure 6:
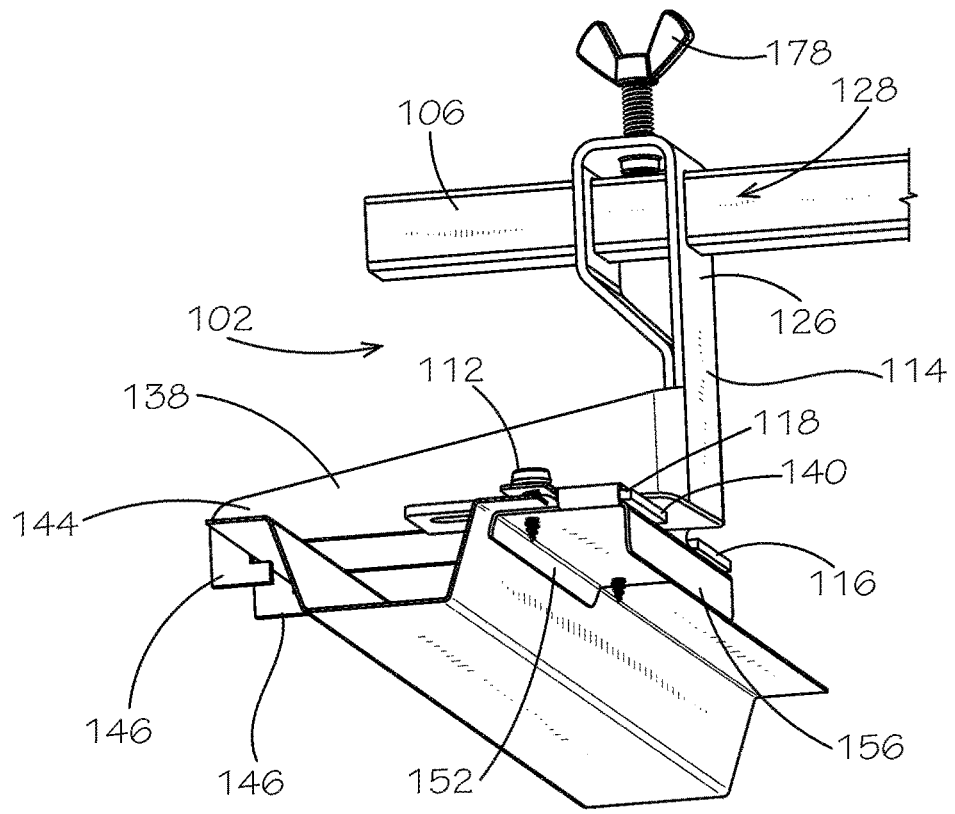
FIG. 6 is a lower perspective view of the closed/bracketed configuration of the clip assembly of FIG. 4.

FIG. 3 shows upper perspective views of clip assembly 102 in an open or unbracketed configuration, and FIG. 4 shows the tightened or bracketed configuration of clip assembly 102. Similar to FIGS. 3 and 4, FIGS. 5 and 6 show lower perspective views of bracket 116 of clip assembly 102 in the open or unbracketed configuration (FIG. 5) and the tightened or bracketed configuration (FIG. 6). In the open position of FIG. 3, the screw 112 is pre-installed in clamp 118 of bracket 116 and loosened such that screw 112 does not pierce a portion of sidewall 148 or trave 104. Bracket 116 is moved back away from trave 104 so that the arcuate guides 122 do not capture an edge 154 of skirt 140. Screw 112 is backed out of bent wing 166 and can partially enter fissure 120 but does not pass-through skirt 140. In this position, an operator can slide the slot 150 formed by knee 144 and foot 146 around the bottom portion 170 of trave 104 and capture the sidewall 148. When the operator presses the flange 156 of bracket 116, ridge 152 moves under the side-flange 124 and presses against the sidewall 148 of trave 104. In other words, one side of frame 114 is held on the first side of trave 104 with the insertion of sidewall 148 into the knee 144 and foot 146 of frame 114. The opposite side of the frame 114 is locked into a locked configuration when bracket 116 is secured under the side-flange 124 and against the sidewall 148 on the opposite side of trave 104, as shown in FIGS. 4 and 6.

When the bracket 116 is in the desired locking position, ridge 152 is pressed against the sidewall 148, and the base 160 is underneath the side-flange 124 of trave 104. In this configuration, screw 112 can be tightened. For example, the operator can depress flange 156 with the thumb of one hand and tighten the pre-installed screw 112 with a screwdriver in the opposite hand. The screw 112 can pass through the fissure 120 of skirt 140 and into a portion of the side-flange 124 of trave 104. In some aspects, screw 112 can be tightened in a fastener opening 184 (shown in FIG. 5) in the base 160 of bracket 116 that causes clamp 118 to create a compressive force on the frame 114 and trave 104 captured within the bracket 116. This configuration can cause clip assembly 102 to comprise a secured bracket 116 and frame 114 to provide structural support for crossbar 106. This way, the support assembly 100 is secured and can resist unwanted movement during vibratory and/or heat loading.

Figure 8:
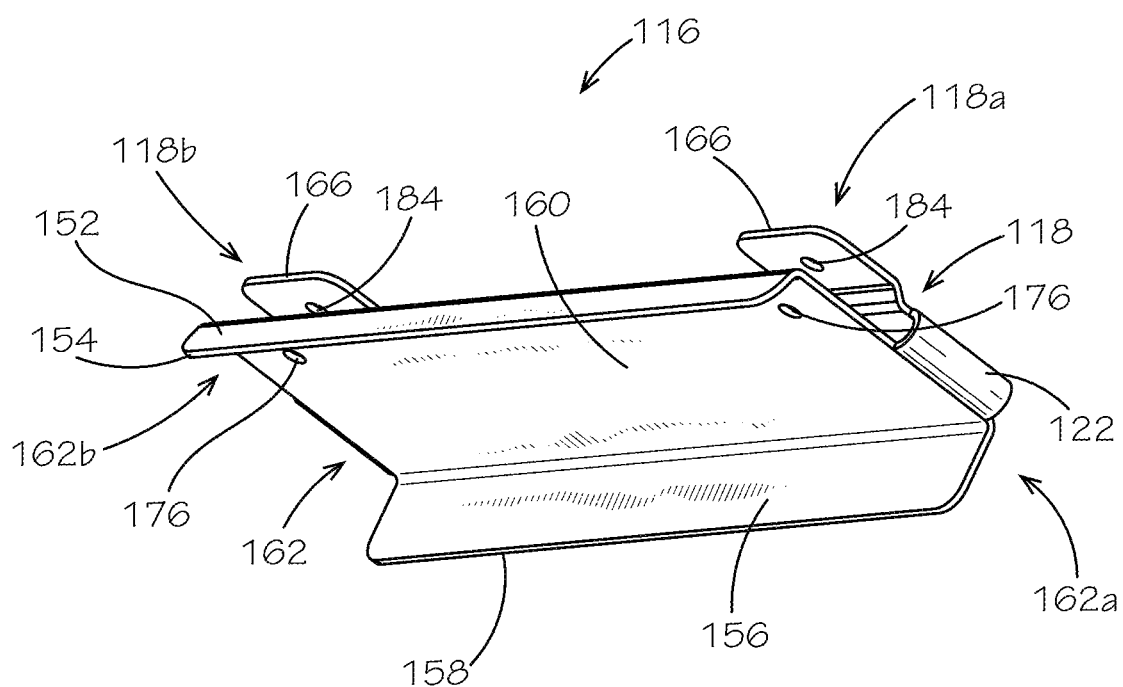
FIG. 8 is a lower perspective view of the bracket of FIG. 7.

FIGS. 7 and 8 are elevated and lower perspective views of bracket 116, respectively. The ridge 152 of bracket 116 is located at one edge 154, and the flange 156 is at the opposite edge 158 of bracket 116. The base 160 extends between ridge 152 and the flange 156 and is interposed between the edges 154 and 158, defining ridge 152 and the flange 156. The base 160 comprises at least two fastener openings 184 for opposing screws 112 (shown in FIG. 1) in clamps 118 located on opposing sides 162 of bracket 116. For example, a first clamp 118 is coupled to a first side 162a of the base 160, and a second clamp 118 is coupled to a second side 162b of the base 160. The first clamp 118a and the second clamp 118b can comprise the same opposing structures configured to capture and compress opposing skirts 140 of frame 114 (frame 114 and skirts 140 shown in FIG. 1). E.g., each clamp 118 comprises an arcuate guide 122, a clamping overlay 164, and a bent wing 166. For the first clamp 118a, the components can be located on the first side 162a of base 160, and for the second clamp 118b, these components can be located on the second side 162b of base 160, e.g., opposite the first side 162a. In some aspects, bracket 116 can be formed from a monolithic planar stamped sheet metal.

The ridge 152, flange 156, and/or clamps 118 of the bracket 116 can be bent and/or formed from the monolithic planar stamped sheet metal.

The arcuate guide 122 can be bow-shaped or arcuate and extend from the corresponding side 162 of base 160 over the corresponding skirt 140 and inwardly back over base 160. The arcuate guide 122 can connect the base 160 to the clamping overlay 164, providing a clamping force on the skirt 140. The clamping overlay 164 can be interposed between the arcuate guide 122 and the bent wing 166. For example, the bent wing 166 can project away from the clamping overlay 164 and over the base 160. Bent wing 166 extends from the clamping overlay 164 and/or the arcuate guide 122 to provide a clamping area that captures both the skirt 140 of the frame 114 and a portion of trave 104 (e.g., a sidewall 148 or side-flange 124 on one side of trave 104, shown in FIG. 1). A second clamp 118b comprising the same or similar features can be coupled to the opposite side (e.g., the second side 162b) of base 160 and further capture and restrain frame 114 from moving axially along trave 104. In various aspects, the arcuate guides 122 of the opposing clamps 118 can be forced against one of the side flanges 124 of trave 104 to capture and restrain movement of the clip assembly 102 (FIG. 2). For example, the clamping overlays 164 can capture the opposing skirts 140, and the bent wings 166 can capture the side flanges 124 (or sidewalls 148) of trave 104 and the skirts 140. This way, slot 150 in the knee 144 and foot 146 of frame 114 (FIG. 2) work with the bracket 116 to lock the clip assembly 102 in a transverse direction 180 (normal to an axial direction 182 in FIG. 1) relative to trave 104. The captured opposing skirts 140 on the frame 114 and screws 112 passing through the fissures 120 (FIG. 1) of the frame 114 and into trave 104 restrain the clip assembly 102 in the lateral or axial direction of trave 104.

A fastener, or screw 112, can be pre-installed within a fastener opening 184 of each bent wing 166. In some aspects, the fastener openings 184 in the bent wings 166 extend over and align with the fastener openings 176 in the base 160. This configuration can enhance the clamping force of the screw 112 as it is threadedly received in the base 160 and tightened to compressively clamp the frame 114 and trave 104 and/or restrain the clip assembly 102 relative to trave 104. In some aspects, the compressive force can adjust or bend the bent wings 166 and force the bent wings 166 to arc inwardly towards the base 160 to increase the clamping force of the clamp 118. For example, the clamping overlay 164 can be attached to arcuate guide 122 and extend inwardly from the corresponding side 162 of base 160.

The arcuate guide 122 can also be biased, e.g., downwardly, to increase the clamping force of the clamp 118. The arcuate guides 122 generate a clamping force on frame 114 by compressing the clamping overlay 164 against the skirt 140 of the frame 114 and bending clamping overlay 164 and bent wing 166 towards base 160 of bracket 116. In some aspects, the bent wings 166 are bent away from the base 160 to facilitate sliding the bracket 116 over a side-flange 124 of a trave 104. When bracket 116 is locked, the screw 112 pierces the base 160 and bends the bent wings 166 extending away from the base 160 inwardly toward the base 160 to increase the clamping force of the clamping overlay 164, arcuate guide 122, and the clamp 118.

In various aspects, a method for installing support assembly 100 is described. The installation method comprises sliding a first end of a frame 114 comprising a slot 150 over a first portion of a trave 104. A portion of the frame 114 comprising an opening 128 is slid over a crossbar 106 of the support assembly 100. A second portion of the trave 104 and a skirt 140 of the frame 114 are captured with a bent wing 166 of a bracket 116 such that the bent wing 166 is secured against the skirt 140 of the frame 114 to secure the frame 114 on the trave 104 by capturing the opposing first and second portions of the trave 104 between the bent wing 166 of the bracket 116 and the slot 150 of the frame 114.

One should note that conditional language, such as, among others, "can," "could," "might," or "may," unless expressly stated otherwise, or otherwise understood within the context as used, is generally intended to convey that certain aspects include. In contrast, other aspects do not include certain features, elements, and/or steps. Thus, such conditional language is not generally intended to imply that features, elements, and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

That which is claimed is:

1. A clip assembly comprising:
    a frame comprising:
        an opening configured to receive a portion of a crossbar;
        a skirt comprising a fissure; and
        a leg comprising:
            a knee; and
            a foot defining a slot; and
    a bracket coupled to the skirt of the frame, the bracket comprising:
        a ridge at an edge of the bracket;
        a flange at an opposite edge of the bracket;
        a base interposed between the ridge and the flange, the base comprising a fastener opening;
        a clamp coupled to the base and comprising a bent wing capturing the skirt of the frame, wherein an overlay of the clamp captures the skirt of the frame against the base, and the bent wing captures the skirt and a sidewall of a trave against the base.

2. The clip assembly of claim 1, wherein an arcuate guide interposed between the base of the bracket and the bent wing of the clamp abuts a sidewall of a trave to restrain the bracket against the sidewall.

3. The clip assembly of claim 1, wherein the frame is a bent metallic sheet defining a head defining a fastener hole and an opposite side, wherein the opposite side of the frame comprises a second opening configured to receive a second portion of the crossbar, and wherein when a fastener is tightened in the fastener hole, a bracketing force is generated against the crossbar that is balanced in double shear on the frame.

4. The clip assembly of claim 1, wherein a piercing fastener is installed in the bent wing that retains the piercing fastener, and the piercing fastener is configured to traverse through the fissure of the frame and pierce the bracket when the piercing fastener is rotated in a tightening direction.

5. The clip assembly of claim 4, wherein the piercing fastener traverses through a side-flange of the trave and threadedly engages threads of the fastener opening in the base of the bracket.

6. The clip assembly of claim 1, wherein the skirt of the frame is a first skirt, the clamp of the bracket is a first clamp, and the bracket further comprises:
the first clamp is coupled to a first side of the base, comprising:
a first arcuate guide;
a first overlay; and
the bent wing is a first bent wing on the first clamp; and
a second clamp coupled to a second opposite side of the base, comprising:
a second arcuate guide;
a second overlay; and
a second bent wing.

7. The clip assembly of claim 6, wherein:
the first arcuate guide of the first clamp is forced against a side flange of a trave;
the second arcuate guide of the second clamp is forced against the side flange of the trave;
the first overlay captures the first skirt of the frame and the second overlay captures a second skirt of the frame; and
the first bent wing and the second bent wing capture the side flange of the trave and the base of the bracket.

8. The clip assembly of claim 6, wherein:
the fissure is a first fissure;
the frame comprises an opposing second skirt with a second fissure;
the first overlay of the first clamp captures the skirt;
the second overlay of the second clamp captures the opposing second skirt;
a first fastener in the first bent wing passes through the first fissure in the first skirt and into a side flange of a trave; and
a second fastener in the second bent wing passes through the second fissure in the second skirt and into the side flange of the trave.

9. A bracket comprising:
a ridge at an edge;
a flange at an opposite edge;
a base interposed between the bracket and the flange, the base comprising at least two fastener openings;
a first clamp coupled to a first side of the base, the first clamp comprising:
a first arcuate guide on the first side of the base;
a first clamping overlay attached to the first arcuate guide and extending inwardly from the first side of the base; and
a first bent wing projecting over the base at the first side and extending from the first clamping overlay; and
a second clamp coupled to a second side of the base, the second clamp comprising:
a second arcuate guide on the second side of the base;
a second clamping overlay attached to the second arcuate guide and extending inwardly from the second side of the base; and
a second bent wing projecting over the base at the second side and extending from the second clamping overlay.

10. The bracket of claim 9, wherein the first bent wing and the second bent wing each comprise a threaded fastener opening that extend over the at least two fastener openings in the base.

11. The bracket of claim 9, wherein the bracket is formed from a monolithic planar stamped sheet metal, and wherein the bracket, the flange, the first clamp, and the second clamp are bent from the monolithic planar stamped sheet metal.

12. The bracket of claim 9, wherein a first skirt of a frame is configured to slide through the first arcuate guide and a second opposite skirt of the frame is configured to slide through the second arcuate guide.

13. The bracket of claim 9, wherein the first arcuate guide and the second arcuate guide are biased and generate a clamping force on a skirt of a frame when the first clamping overlay and the second clamping overlay receive the skirt.

14. The bracket of claim 9, wherein the first bent wing and the second bent wing are bent away from the base to facilitate sliding the bracket over a skirt of a frame and a side-flange of a trave.

15. The bracket of claim 14, wherein a screw in the first bent wing pierces the base and bends the first bent wing inwardly toward the base in a bracketed position.

16. A mounted support assembly comprising:
a hub slidably coupled to a crossbar, the hub adjustably supporting a sprinkler;
a first frame coupled to the crossbar of the hub, the first frame comprising:
an opening supporting an end of the crossbar and coupling the first frame to the hub;
a skirt comprising an elongated slot; and
a leg comprising:
a knee; and
a foot; and
a first bracket coupled to the skirt of the first frame, the first bracket comprising:
a ridge at an edge;
a flange at an opposite edge;
a base interposed between the ridge and the flange, the base comprising a fastener opening;
a clamp coupled to a first side of the base and comprising a bent wing capturing the skirt of the first frame; and
a second frame comprising:
a second opening supporting an opposite end of the crossbar;
a second skirt comprising a second fissure; and
a second leg comprising:
a second knee; and
a second foot; and
a second bracket coupled to the skirt of the second frame, the second bracket comprising:
a ridge at a second edge;
a flange at an opposite edge;
a base interposed between the ridge and the flange, the base comprising a fastener opening;
a clamp coupled to a second side of the base, comprising:
a clamping overlay that frictionally captures the skirt of the first frame;
an arcuate guide coupled to and interposed between the second side of the base and the clamping overlay; and
a bent wing capturing the skirt of the first frame, the bent wing comprising a fastener that passes through the second fissure of the second skirt and the fastener opening in the base.

17. The support assembly of claim 16, wherein the first frame and the second frame each further comprise:
   an opposing skirt; and
   an opposite leg coupled to the opposing skirt, comprising:
      a knee; and
      a foot.

18. The support assembly of claim 16, wherein the base of the first bracket and the base of the second bracket each comprise a second fastener opening, such that there are two or more fastener openings in the base, and wherein the first bracket and the second bracket each further comprise:
   an opposing clamp coupled to an opposite side, the opposing clamp comprising:
      an opposing arcuate guide;
      an opposing clamping overlay; and
      an opposing bent wing.

* * * * *